United States Patent
Amparan

(10) Patent No.: US 12,213,452 B1
(45) Date of Patent: Feb. 4, 2025

(54) QUICK DISPOSAL SANITARY SYSTEM AND METHOD OF USE

(71) Applicant: Alonso Amparan, Plano, TX (US)

(72) Inventor: Alonso Amparan, Plano, TX (US)

( * ) Notice: Subject to any disclaimer, the term of this patent is extended or adjusted under 35 U.S.C. 154(b) by 123 days.

(21) Appl. No.: 18/093,266

(22) Filed: Jan. 4, 2023

Related U.S. Application Data

(63) Continuation-in-part of application No. 16/413,201, filed on May 15, 2019, now abandoned.

(51) Int. Cl.
*A01K 23/00* (2006.01)
*B65F 1/00* (2006.01)

(52) U.S. Cl.
CPC ............ *A01K 23/005* (2013.01); *B65F 1/002* (2013.01); *B65F 2240/136* (2013.01)

(58) Field of Classification Search
CPC .... A01K 1/0157; A01K 23/005; A01K 1/015; A01K 1/0107; A01K 1/0125; B25F 1/002
See application file for complete search history.

(56) References Cited

U.S. PATENT DOCUMENTS

| | | | | |
|---|---|---|---|---|
| 4,869,204 A | * | 9/1989 | Yananton | A01K 1/0107 119/169 |
| 5,850,798 A | * | 12/1998 | Engel | A01K 1/0107 119/170 |
| 11,129,365 B1 | * | 9/2021 | Gregson | A01K 1/0107 |
| 2009/0114161 A1 | * | 5/2009 | Carnahan | A01K 1/0125 119/169 |
| 2009/0194033 A1 | * | 8/2009 | Modlin | A01K 1/0107 119/167 |
| 2013/0068169 A1 | * | 3/2013 | Miller | A01K 1/0125 119/161 |
| 2014/0261209 A1 | * | 9/2014 | Haddad | A01K 1/0107 119/161 |
| 2016/0113232 A1 | * | 4/2016 | Thompson | A01K 1/01 119/172 |
| 2017/0280671 A1 | * | 10/2017 | Miller | B32B 3/06 |
| 2021/0251193 A1 | * | 8/2021 | Gregson | A01K 23/005 |
| 2022/0240481 A1 | * | 8/2022 | Axelrod | A01K 1/0107 |
| 2023/0309503 A1 | * | 10/2023 | Axelrod | A01K 1/0107 119/171 |
| 2024/0074404 A1 | * | 3/2024 | Brice | A01K 1/0107 |

* cited by examiner

*Primary Examiner* — Trinh T Nguyen
(74) *Attorney, Agent, or Firm* — Richard Eldredge; Leavitt Eldredge Law firm

(57) ABSTRACT

A quick disposal sanitary system that enables the collection of deposited waste materials is disclosed. The system includes an absorbent pad; a liquid impervious layer extending outwardly from the absorbent pad, creating a peripheral boundary; and a drawstring system having a cord and a pull-tab; wherein the cord is disposed in the peripheral boundary. The drawstring system is configured to fold the peripheral boundary inwardly, thereby causing the absorbent pad and the liquid impervious layer to constrict and gather into a closed configuration constrict.

1 Claim, 6 Drawing Sheets

QUICK DISPOSAL SANITARY SYSTEM AND METHOD OF USE

CROSS REFERENCE TO RELATED APPLICATIONS

This application is a continuation of U.S. application Ser. No. 16/413,201, filed on May 15, 2019, of which is incorporated herein by reference in its entirety.

BACKGROUND

1. Field of the Invention

The present invention relates generally to pet sanitation systems, and more specifically, to a quick disposal sanitary system that enables the efficient removal of a soiled sanitation pad.

2. Description of Related Art

Pet sanitation systems are well known in the art and are effective means to allow for the containment of pet excrement and urine within a confined space. For example, pet sanitation pads have an absorbent material that captures the urine and allows the feces to rest on top thereof. Commonly, the pet sanitation pads are placed on the floor or in a cage where the animal has access thereto. The animal will relieve themselves on thereon. A person will come and gather up the pad with the material deposited by the animal for disposal.

One of the problems commonly associated with pet sanitation systems is their limited efficiency. For example, the aforementioned absorbent pad has no ability to secure or otherwise capture and hold the feces of the animal so that when the pet sanitation system is collected there is the chance that the feces may fall out of it while it is gathered or carried.

Accordingly, although great strides have been made in the area of pet sanitation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
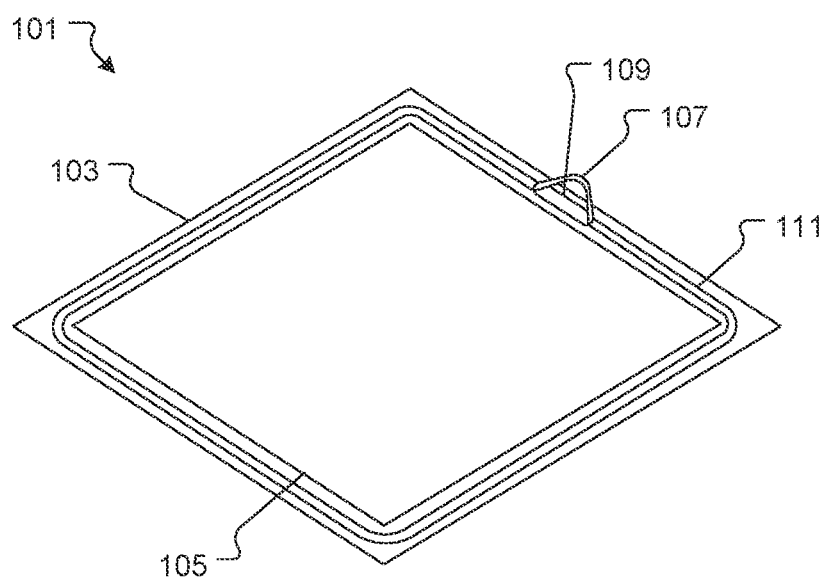
FIG. 1 is a perspective view of a quick disposal sanitary system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional pet sanitation systems. Specifically, the present invention of the present application enables the gathering and disposal of a used absorbent pad without risk of dropping feces or other material deposited thereon. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a perspective view of a quick disposal sanitary system in accordance with a preferred embodiment of the present application. It will be appreciated that system 101 overcomes one or more of the above-listed problems commonly associated with conventional pet sanitation systems.

In the contemplated embodiment, system 101 includes a liquid impervious layer 103 that warps around the edge of an absorbent pad 105 and covers the bottom surface thereof. The system includes a cord 107 passes around the periphery of the absorbent pad 105 within a channel 111 and is accessible via an opening 109.

Figure 2A:
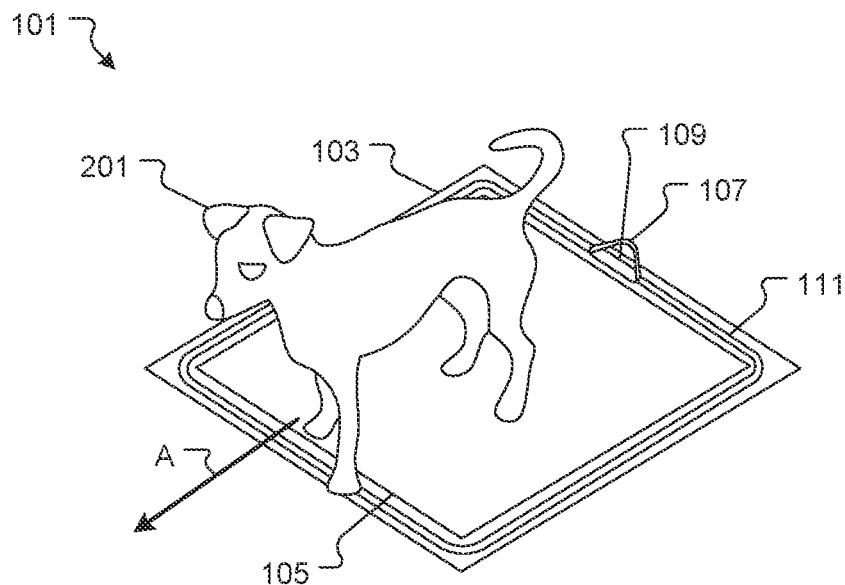
FIGS. 2A, 2B and 2C are X views of the system of FIG. 1 in use.
Figure 2B:
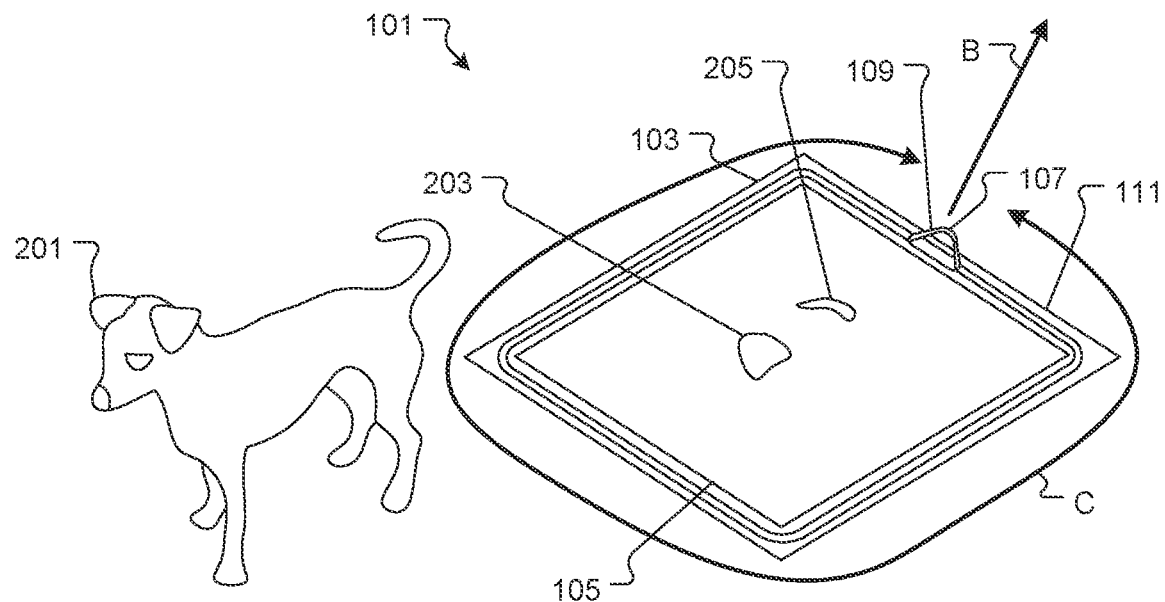
Figure 2C:
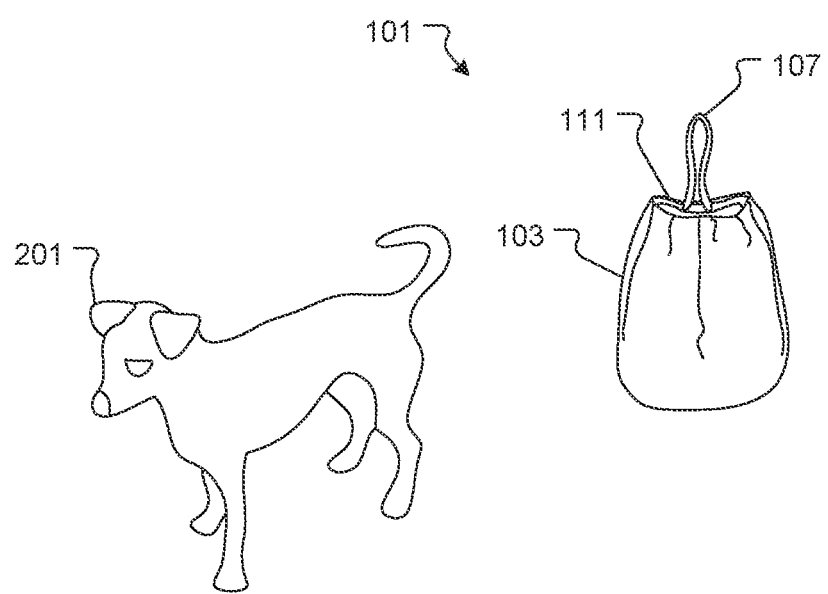

Referring now to FIGS. 2A, 2B and 2C the use of system 101 is depicted. In use, the system 101 is placed so as to be accessible by a pet 201. The pet stands on the system 101 and releases urine 203 or fecal matter 205 on the absorbent pad 105 and it is retained therein via the liquid impervious layer 103. The pet 201, departs as depicted by motion A. The cord 107 is pulled through the opening 109 as depicted by motion B. This causes the cord 107 to constrict as depicted by motion C. As the cord constricts the channel causes the absorbent pad 105 and liquid impervious layer to gather retaining the deposited waste materials within.

It should be appreciated that one of the unique features believed characteristic of the present application is that cord 107 and channel 111 allow for the containment of the fecal matter 205 deposited on the absorbent pad preventing it from falling or otherwise exiting the absorbent pad 105.

Figure 3:
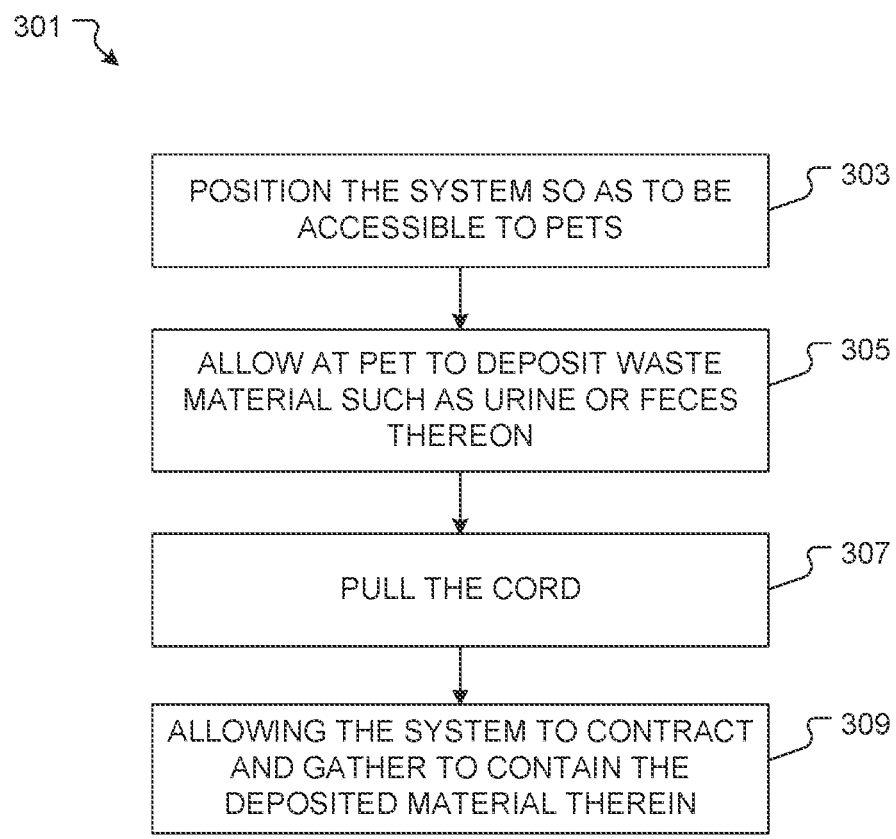
FIG. 3 is a flowchart of the preferred method of use of the system of FIG. 1.

Referring now to FIG. 3 the preferred method of system 101 is depicted. Method 301 includes positioning the system so as to be accessible to pets 301, allowing at pet to deposit waste material such as urine or feces thereon 303, pulling on the cord 305 and allowing the system to contract and gather to contain the deposited material therein 307.

Figure 4:
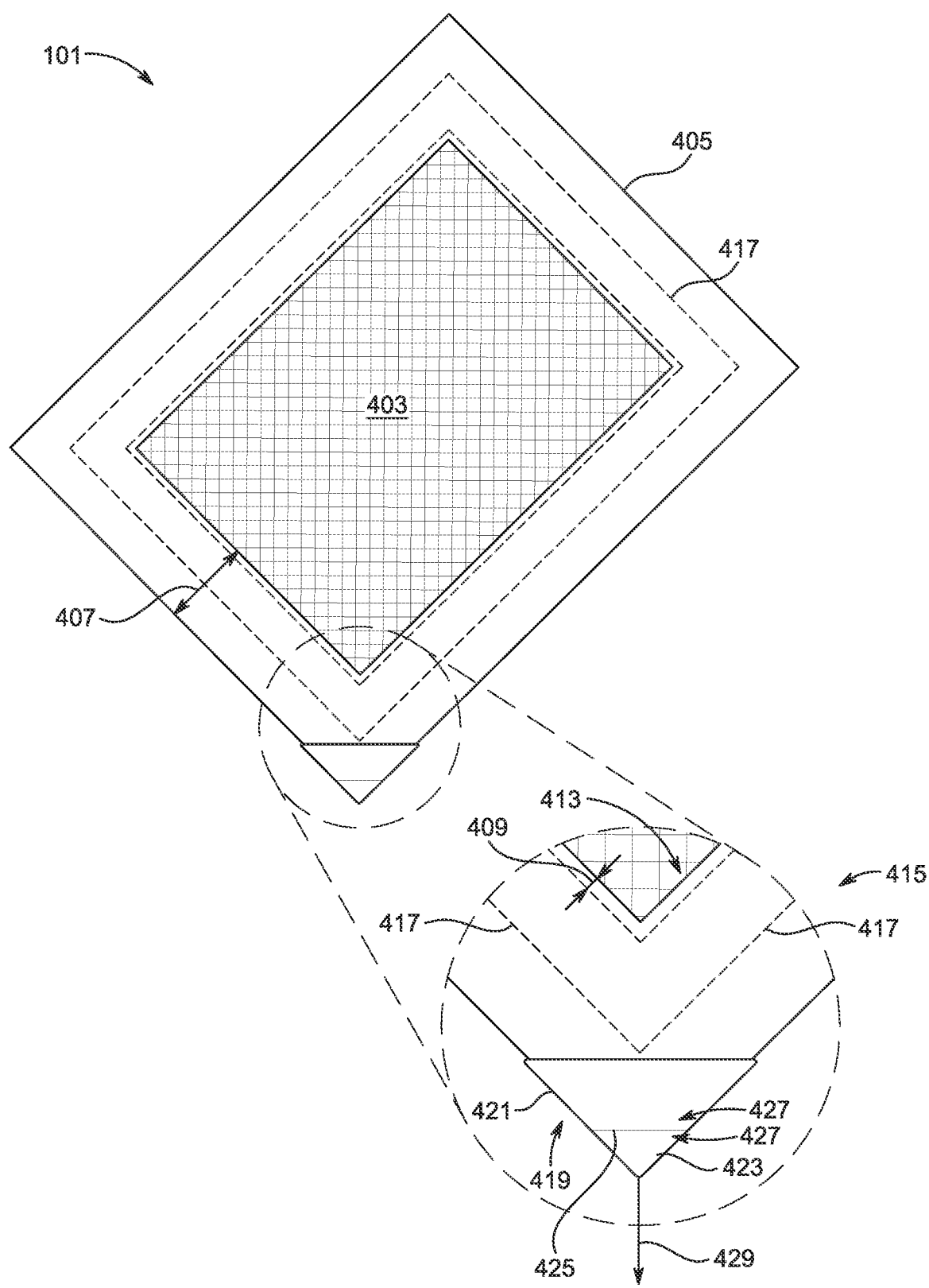
FIG. 4 is a perspective view of an alternative quick disposal sanitary system in accordance with one or more embodiments of the present application.

Referring now to FIG. 4, an alternative quick disposal sanitary system 401 is illustrated. In the contemplated embodiment, system 401 includes an absorbent pad 403 and a liquid impervious layer 405. The liquid impervious layer 405 covers the bottom surface of the absorbent pad 403 and extends outwardly from the absorbent pad 403, creating a peripheral boundary 407. The liquid impervious layer 405 also includes an awning-like structure 409 extending inwardly over a predetermined portion 411 of the absorbent pad 405, creating a cavity 413 between the awning-like structure 409 and the absorbent pad 405. It should be appreciated that the awning-like structure 409 allows liquids such as urine to seep underneath, thereby preventing liquids from breaching the peripheral boundary 407.

System 401 also includes a drawstring system 415 configured to fold the peripheral boundary 417 inwardly, causing the absorbent pad 403 and the liquid impervious layer 405 to constrict and gather into a closed configuration. The drawstring system 415 includes a cord 417 and a pull-tab 419. The cord 417 is disposed within the peripheral boundary 407. The opposing ends of the cord 417 communicate with the pull-tab 419. The pull-tab 419 includes a base portion 421 and a release portion 423. The base portion 421 is secured to the peripheral boundary 407. The release portion 423 includes scored edging 425 to facilitate twisting and pulling of the release portion 423 away from the base portion 421, as shown with directional arrows 427, 429, respectively.

It should also be appreciated that one of the unique features believed characteristic of system 401 is the configuration of awning-like structure 409 and the drawstring system 415 for containing waste material therein, thereby improving cleanliness and user convenience.

Figure 5:
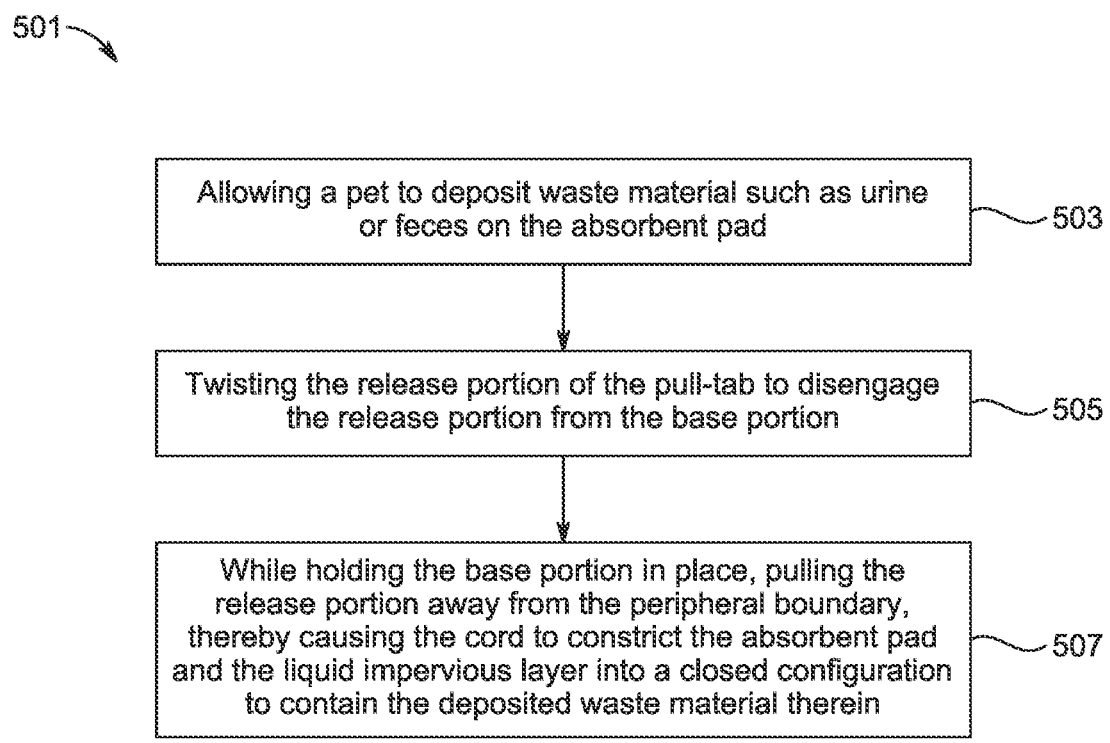
FIG. 5 is a flowchart of the preferred method of use of the system of FIG. 4.

Referring now to FIG. 5, a flowchart 501 depicts a method of use of system 401. First, a pet is allowed to deposit waste material such as urine or feces on the absorbent pad, as shown with box 503. Next, the release portion of the pull-tab is twisted to disengage the release portion from the base portion, as shown with box 505. Next, while holding the base portion of the pull-tab in place, the release portion is pulled away from the peripheral boundary, thereby causing the cord to constrict the absorbent pad and the liquid impervious layer into a closed configuration to contain the deposited waste material therein, as shown with box 507.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A quick disposal sanitary system, comprising:
   an absorbent pad;
   a liquid impervious layer covering the bottom surface of the absorbent pad, and extending outwardly from the absorbent pad, thereby creating a peripheral boundary, the liquid impervious layer having:
   an awning-like structure extending inwardly over a portion of the absorbent pad, thereby creating a cavity between the awning-like structure and the absorbent pad;
   wherein the awning-like structure prevents liquid from breaching the peripheral boundary; and
   a drawstring system configured to fold the peripheral boundary inwardly, thereby causing the absorbent pad and the liquid impervious layer to constrict and gather into a closed configuration, the drawstring system having:
   a cord disposed within the peripheral boundary; and
   a pull-tab having a base portion and a release portion, wherein the base portion is secured to the peripheral boundary, wherein the release portion includes scored edging to facilitate twisting and pulling of the release portion away from the base portion;
   wherein the opposing ends of the cord communicate with the pull-tab.

\* \* \* \* \*